Oct. 13, 1964    L. GOLDMUNTZ    3,153,233
FIXED TRACKER RADAR SYSTEM
Filed Nov. 1, 1962    5 Sheets-Sheet 1

INVENTOR.
LAWRENCE GOLDMUNTZ
BY Darby & Darby
ATTORNEYS

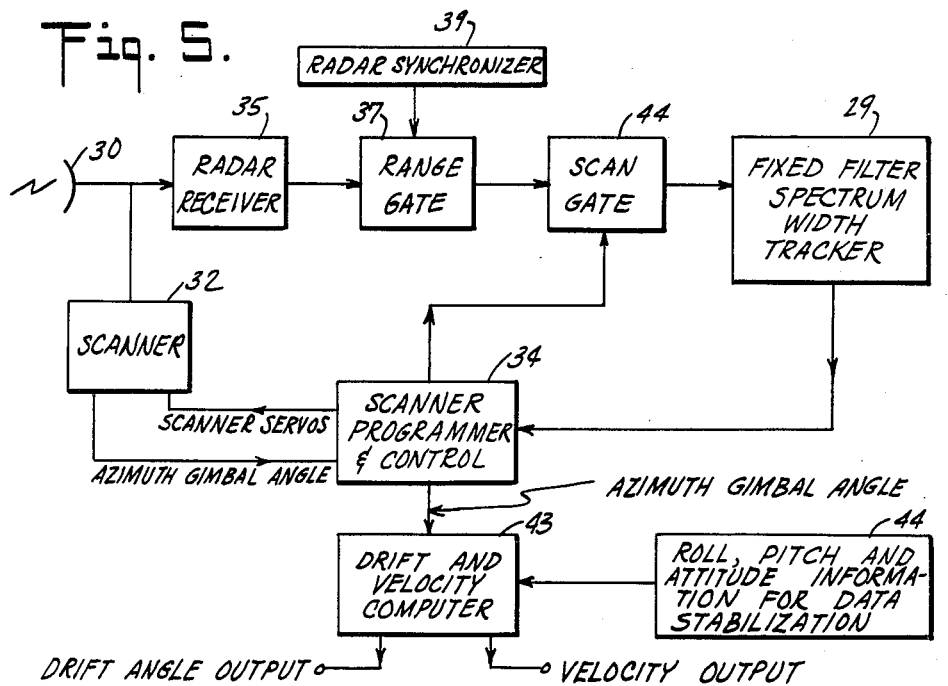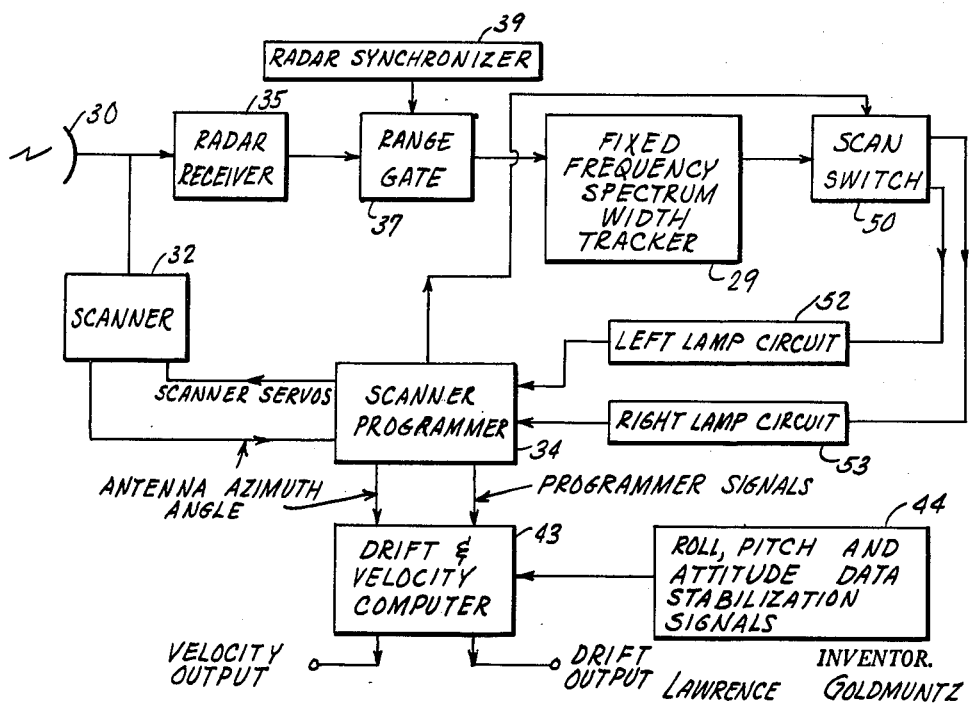

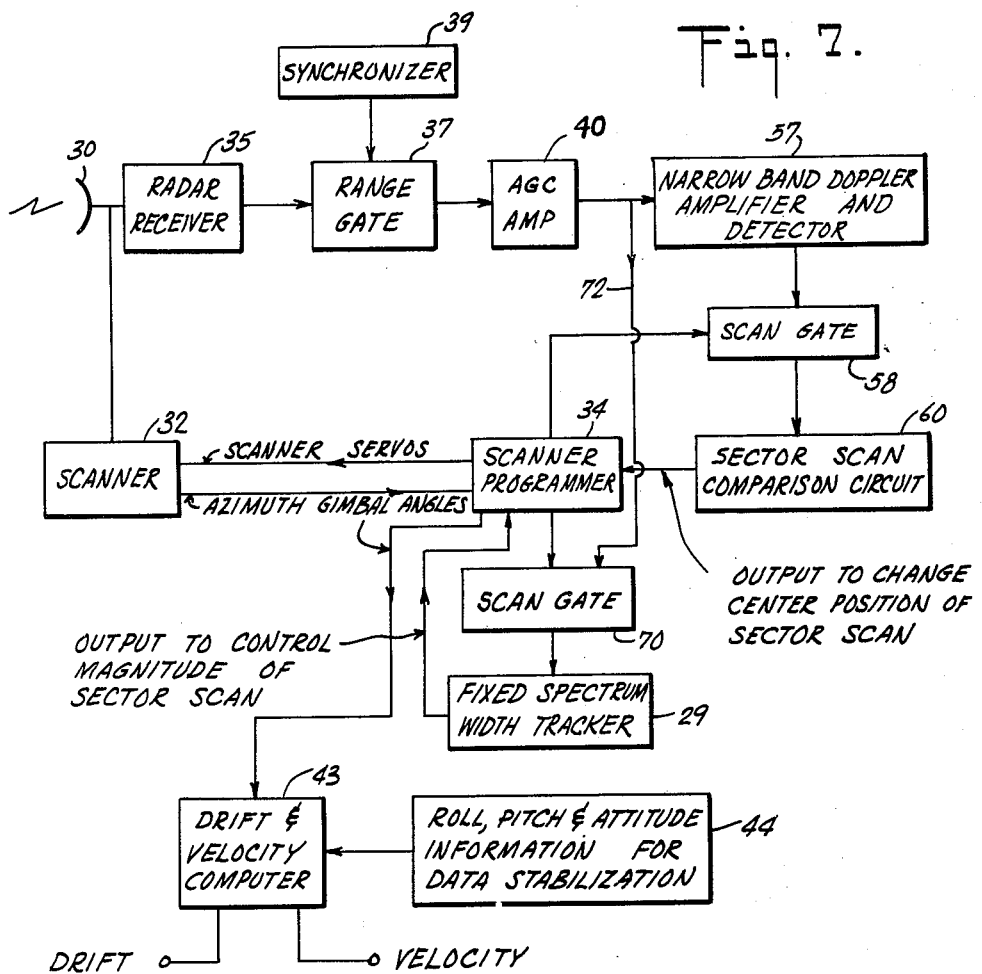
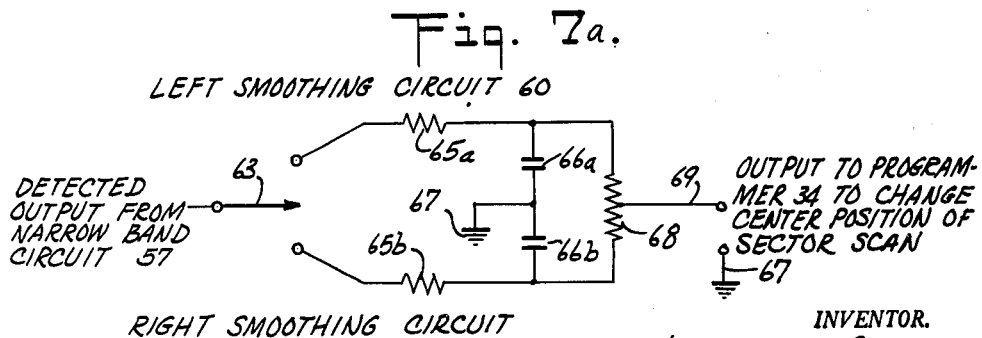

Oct. 13, 1964  L. GOLDMUNTZ  3,153,233
FIXED TRACKER RADAR SYSTEM
Filed Nov. 1, 1962  5 Sheets-Sheet 5
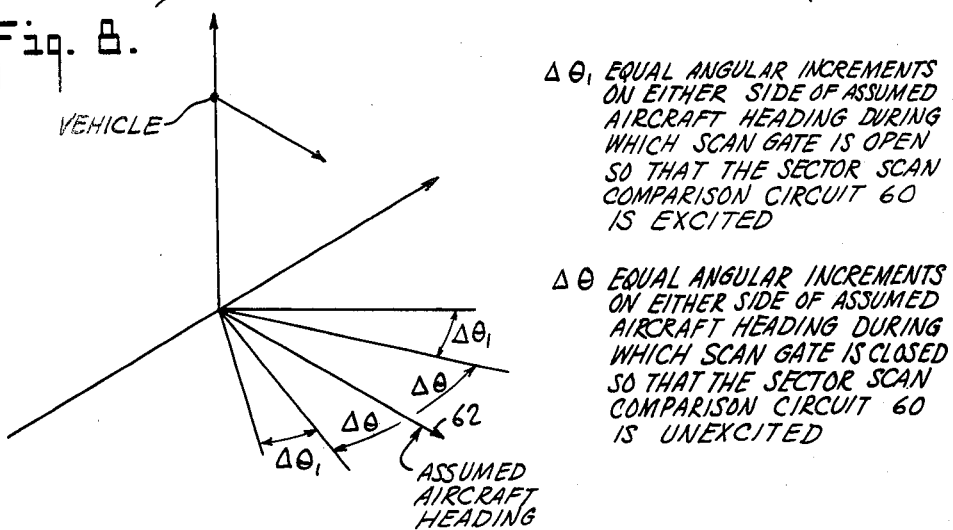
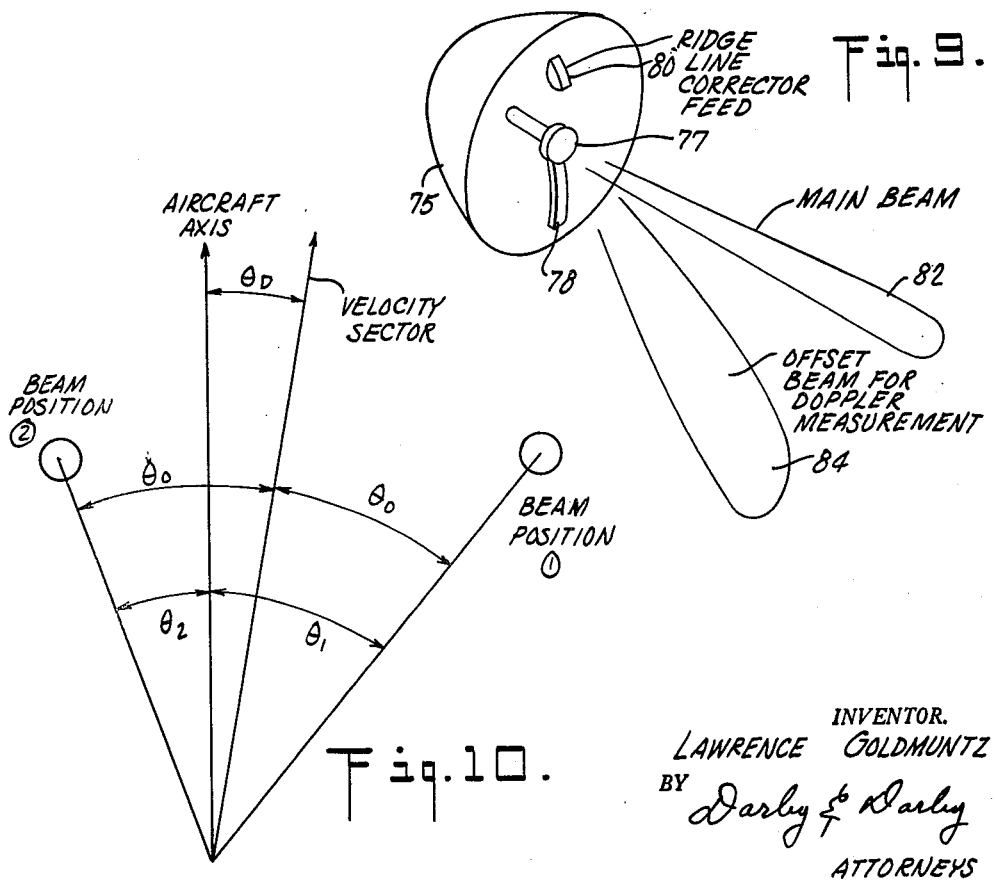
INVENTOR.
LAWRENCE GOLDMUNTZ
BY Darby & Darby
ATTORNEYS

United States Patent Office                                    3,153,233
                                                     Patented Oct. 13, 1964

3,153,233
FIXED TRACKER RADAR SYSTEM
Lawrence Goldmuntz, Huntington, N.Y., assignor to
  TRG, Incorporated, Syosset, N.Y., a corporation of
  New York
  Filed Nov. 1, 1962, Ser. No. 234,670
  23 Claims. (Cl. 343—8)

This invention relates to radar systems and more particularly to a Doppler radar system for use in a vehicle which has a fixed spectrum width tracker for measuring the spectrum width of a Doppler spectrum, for which velocity and drift angle information is obtained.

In many applications it is desirable to make accurate measurements of certain physical quantities of the environment in which a vehicle moves. One such application would be in aircraft where it is often necessary to make precise measurements of the aircraft velocity and drift angle with respect to the terrain over which the aircraft is flying. The measurements of these quantities are used for navigation purposes and in the weapons system of the aircraft for precision radar bombing, and/or for radar fire control purposes.

One way to accomplish the measurement of the desired quantities is by a radar system of the Doppler type. The Dopple radar may be a separate system, or else the main radar system of the aircraft or other vehicle, may be fitted with a Doppler adapter. In either case, the Doppler effect is utilized to obtain the necessary information.

Generally, the manner in which the desired measurements are made with a Doppler radar system is by transmitting a beam of energy from the radar antenna to illuminate the scatterers in a patch of the terrain over which the vehicle is moving. The beam of energy which is reflected back to the vehicle from the scatterers and received is shifted in frequency by an amount which is dependent upon the velocity of the vehicle with respect to the terrain. Since the antenna beamwidth is not infinitesimal and because the duration of illumination of scatterers is limited, a Doppler spectrum is formed at the second detector of the radar receiver. The Doppler spectrum has a frequency bandwidth which is dependent, among other quantities, upon the drift angle and the velocity of the vehicle with respect to the terrain, the frequency of transmission of the beam of energy, the antenna beamwidth, and the position of the radar antenna with respect to the vehicle axis. By measuring the bandwidth of the Doppler spectrum, for example, with a suitable frequency tracker, and by performing computations involving this spectrum width, it is possible to determine the aircraft velocity and drift angle.

In accordance with the present invention a Doppler radar system is provided which utilizes a scanning type antenna and a fixed frequency tracker. In this system, the antenna is scanned to angular positions on each side of the vehicle axis until a Doppler spectrum of a selected bandwidth is produced. In response to this selected bandwidth Doppler signal spectrum a predetermined level output signal is produced by the fixed frequency tracker. When Doppler signal spectra having bandwidths different from the selected bandwidth are applied to the tracker, correspondingly different output signals are produced. These different output signals from the tracker are used to position the antenna to the angle at which the selected bandwidth Doppler signal spectrum is produced. The angles of antenna position at which the selected bandwidth occur are measured. Since the angle of antenna scan on each side of the vehicle axis needed to produce the predetermined output signal from the tracker is a function of the vehicle velocity and drift angle, computations are performed utilizing the measured angles, either manually or automatically, to compute these quantities.

It is therefore an object of this invention to provide a Doppler radar system.

Another object of this invention is to provide a Doppler radar system which utilizes a fixed tracker for producing a predetermined level output signal in response to a Doppler spectrum of a certain width.

A further object of this invention is to provide a Doppler radar system which utilizes a fixed tracker for obtaining information from Doppler spectra in an incoherent type radar system.

Yet another object of this invention is to provide a Doppler radar system wherein the Doppler measurements are made with the radar antenna located at different angles with respect to the aircraft axis.

A further object of this invention is to provide a Doppler radar system having a fixed tracker which produces a predetermined output signal in response to a Doppler spectrum of a certain width and from which velocity and drift information can be obtained.

Other objects and advantages of this invention will become apparent upon consideration of the following specification and annexed drawings in which:

FIGURES 4b–4c are graphical representations of certain of the characteristics of the frequency tracker of FIGURE 4a;

FIGURE 6 is a schematic block diagram of another embodiment of the invention;

FIGURE 6a is a schematic diagram of the clamper circuits of FIGURE 6;

FIGURE 7 is a schematic block diagram of another embodiment of the invention which utilizes separate filters;

FIGURE 7a is a schematic diagram of the sector scan comparison circuit of FIGURE 7;

FIGURE 8 is a diagram showing the antenna scan pattern for the system of FIGURE 7;

FIGURE 9 is a drawing of an antenna which radiates separate beams for simultaneous search and Doppler measurements; and FIGURE 10 is a plot of the vehicle axis velocity vectors and antenna beam positions.

Figure 1:
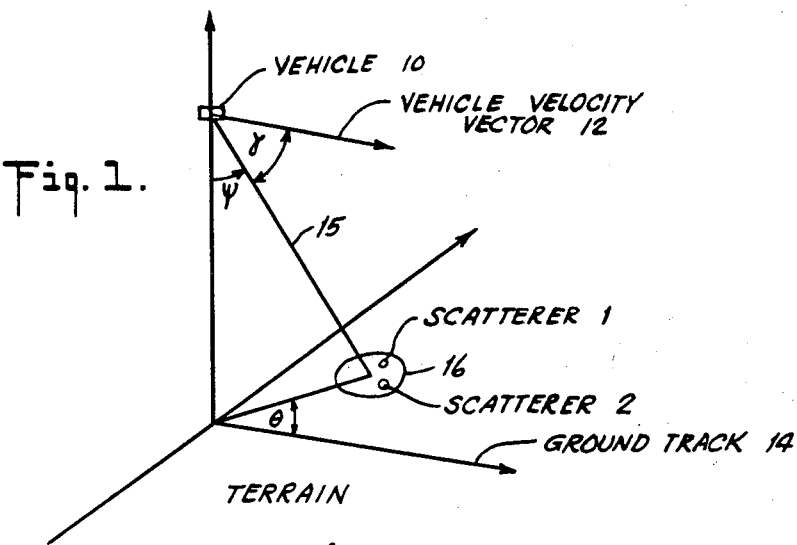
FIGURE 1 is a diagram used in the explanation of the Doppler effect.

Referring to FIGURE 1, a moving vehicle 10 such as an aircraft, is shown as traveling along a course such that it has a velocity vector 12. The projection of this velocity vector 12 on the terrain, for example, land or water, over which the vehicle is moving, is the ground track 14. The vehicle 10 has a radar transmitter (not shown) of a well known type, which transmits a beam of radiant energy of a predetermined frequency along the ray line 15 toward the terrain. This beam of energy spreads out from the transmitting antenna and illuminates a patch of terrain 16 which may be considered as having therein a number of "scatterers," that is, objects from which a radar beam is reflected. Examples of such objects are leaves, branches, metal objects, water, etc.

When the beam of radiant energy strikes a scatterer, some of it is reflected back to the vehicle where it is picked up by the radar receiver antenna. In the usual case, the same antenna is used for both the transmitter and receiver portions of the radar system. This is accomplished by means of a suitable duplexer and TR system, both of which are well known in the art. Due to the Doppler effect, brought about by the velocity of the vehicle, the wave reflected by each scatterer to the radar receiver is shifted in frequency from the original frequency of the transmitted wave by an amount equal to:

$$(1) \qquad f_\mathrm{d} = \frac{2V}{\lambda} \cos \gamma = \frac{2V}{\lambda} \cos \theta \sin \psi$$

where $f_\mathrm{d}$ is the Doppler frequency shift;
$V$ is the velocity of the vehicle;
$\lambda$ is the wavelength of the energy radiated by the radar transmitting antenna;
$\gamma$ is the angle between the ray illuminating the scatterer and the velocity vector of the aircraft;
$\theta$ is the angle between the ground track and the projection of the antenna ray line on the terrain; and
$\psi$ is the elevation angle of the antenna ray line to the vertical.

Figure 2A:
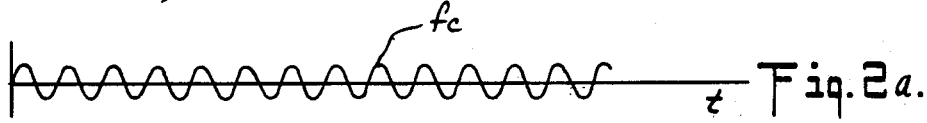
FIGURES 2a–2c show the formation of the Doppler spectrum for a coherent type radar transmitter.
Figure 2B:
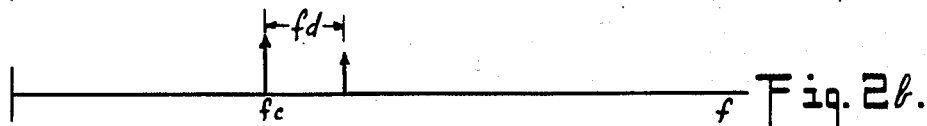
Figure 2C:
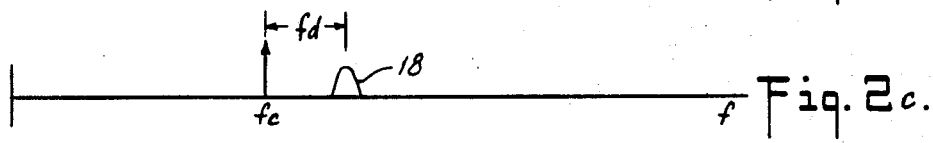

If the beam of radiant energy which was used to illuminate the patch of scatterers 16 was produced by a coherent transmitter, meaning that the phase of the waveform before detection at the radar receiver second detector is continuous from pulse to pulse, then a patch of illuminated scatterers return a signal whose average Doppler frequency shift, i.e., center frequency of the Doppler spectrum, is given by Equation 1. This effect is shown in FIGURES 2a, 2b, and 2c, wherein FIGURE 2a represents the output waveform of a coherent radar transmitter of the CW type which transmits a coherent wave at a carrier frequency $f_\mathrm{c}$. In the idealized case represented by Equation 1, the carrier frequency $f_\mathrm{c}$ is shifted by an amount $f_\mathrm{d}$ upon reflection from the patch of scatterers 16. This is shown in FIGURE 2b. In the actual case, since the scatterers in the patch 16 subtend different $\gamma$ angles with the vehicle's velocity vector 12, a number of frequency components having different Doppler frequency shifts are produced. The Doppler shifted frequency components form a Doppler spectrum which is centered at the average Doppler frequency $f_\mathrm{d}$. In the coherent transmitter system, the frequency at which the Doppler spectrum is centered is equal to the carrier frequency $f_\mathrm{c}$ plus the Doppler frequency shift $f_\mathrm{d}$, given by Equation 1. This situation is shown in FIGURE 2c, where the Doppler spectrum present at the radar receiver second detector is designated by reference numeral 18. The width of the Doppler spectrum 18, which is measured in cycles per second, is designated $\sigma_\mathrm{g}$ and is usually described as being due to geometric effects.

The width of a received Doppler spectrum is broadened if the scatterers within the illuminated patch are moving with respect to each other. This additional dispersion, $\sigma_\mathrm{w}$ of the spectrum is proportional to the standard deviation of the scatterer velocity. The width of the spectrum is also broadened due to the limited duration of illumination of a patch of scatterers because of the vehicle motion. These two factors, which contribute to the broadening of the Doppler spectrum, can be made negligible in comparison to the geometric spectrum width $\sigma_\mathrm{g}$ by proper beam orientation and for many practical purposes may be disregarded. Another cause of spectrum broadening, $\sigma_\mathrm{s}$, which must be considered is that which is due to the scanning motion of the antenna beam. This affects the spectrum width since the spectrum width due to antenna scanning is given by the ratio of the antenna scanning rate to the antenna beamwidth. In many cases, the spectrum broadening due to the antenna scanning is not negligible and therefore cannot be disregarded.

Figure 3A:
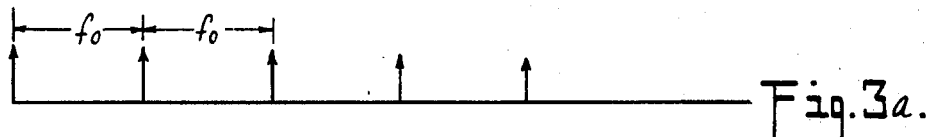
FIGURES 3a–3b are graphical representations of the formation of the Doppler spectrum for an incoherent type radar transmitter.
Figure 3B:
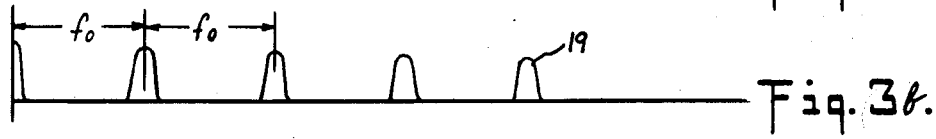

If the effective illuminating waveform is from a pulsed type radar transmitter which is of the incoherent type, meaning that there is an arbitrary phase change at each pulse, the spectrum of the Doppler return is centered at a frequency of zero cycles per second and at harmonics of the repetition frequency, rather than at the frequency $f_\mathrm{c} + f_\mathrm{d}$, as shown in FIGURE 2c. FIGURE 3a shows the spectral lines of the spectrum of a pulsed type incoherent radar transmitter which is transmitting a pulse of energy at a pulse repetition rate $f_0$. FIGURE 3b shows the spectrum 19 of the Doppler return at the second detector for the pulse of this incoherent transmitter. It can be seen that the spectrum of the Doppler return is centered at a frequency of zero cycles per second and at harmonics of the repetition frequency rather than being shifted by an amount equal to the average Doppler frequency of Equation 1.

The width of the spectrum of FIGURE 3b is also affected by the considerations previously discussed with respect to FIGURES 2a, 2b, and 2c.

At the second detector of the receiver of an incoherent radar system, the returns from all scatterers whose echoes overlap in time demodulate each other coherently. This is shown below. The waveform of the return in the intermediate frequency amplifier strip of the radar receiver from scatterer 1 (see FIGURE 1) in the illuminated patch 16 is given by:

$$(2) \qquad \cos\ [(w_{1_\mathrm{f}} + f_{\mathrm{d}_1})t_i + \phi_1]$$

and the return from scatterer 2 in the illuminated patch is given by:

$$(2a) \qquad \cos\ [w_{1_\mathrm{f}} + f_{\mathrm{d}_2})t + \phi_1]$$

where $f_{\mathrm{d}_1}$ and $f_{\mathrm{d}_2}$ are the Doppler shifts associated with the scatterers' position in the illuminated patch, and $\phi_\mathrm{i}$ is the random phase with which the transmitter commences oscillation on the $i$th pulse. At the second detector, these two returns coherently demodulate each other giving rise to a low frequency term of the form:

$$(2b) \qquad \cos\ (f_{\mathrm{d}_1} - f_{\mathrm{d}_2})t$$

This difference frequency term is independent of the phase, $\phi_\mathrm{i}$, with which the pulses from the transmitter commence oscillation and is, in this sense, coherent. In fact, the output of the receiver second detector consists of all possible difference Doppler frequencies as formed by the shifted frequencies returned from the individual scatterers in the illuminated patch.

Due to the coherent type of demodulation, a spectrum is formed consisting of the difference of the Doppler frequency shifts associated with those scatterers in the illuminated patch whose return echoes overlap in time. This spectrum is called a differential Doppler spectrum.

The differential Doppler spectrum width, if the geometric factor predominates, is given by the following equation:

$$(3) \qquad \sigma_\mathrm{g} = \frac{2V}{\lambda} \sin \gamma \Delta\gamma$$

where $\gamma$ is the angle between the aircraft's velocity vector 12 and the ray line 15 to the center of the illuminated patch and $\Delta\gamma$ is the antenna beam width in the $\gamma$ direction (the "half power" spread of the $\gamma$ angle subtended by the illuminated patch).

The exact expression for the geometric spectrum width depends on several factors. Among these are the antenna pattern, the pulse length of the transmitted pulse, the $\theta$ and $\psi$ angles, and the time duration of the range gate of the system (if one is used). Generally, there are two components to the geometric spectrum width, $\sigma_\mathrm{g}$, corresponding to the two dimensions of the illuminated patch on the terrain. One of these dimensions is determined by the antenna beamwidth and is given by the equation:

$$(3.1) \qquad \sigma_{\mathrm{g}_1} = \frac{2V}{\lambda} \sin \theta \sin \psi(\Delta\theta)$$

where $\sin \psi(\Delta\theta)$ is the antenna azimuthal beamwidth. The other component of the geometric spectrum is determined by the pulse length, assuming it equals the range gate width, and is given by the following equation:

$$(4) \quad \sigma_{g_2} = \frac{2V}{\lambda} \cos \theta \cos \psi (\Delta \psi)$$

$$= \frac{2V}{\lambda} \cos \theta \frac{\cos^2 \psi}{\sin \psi} \frac{c\tau}{2R}$$

where $c$ is the velocity of propagation of the energy of the radiated beam:

$\tau$ is the pulse length of the transmitted beam; $R$ is the slant range (line 15);

$\psi$ is the elevation angle to the antenna ray from the vertical; and $\Delta \psi$ is the virtual antenna beamwidth in the elevational direction due to the range gate.

For many antenna patterns and geometries, the total geometric spectrum width is the square root of the sum of the squares of the two components given above in Equations 3 and 4:

$$(5) \quad \sigma_g = (\sigma_{g_1}^2 + \sigma_{g_2}^2)^{1/2}$$

$$= \frac{2V}{\lambda} (\rho \sin^2 \theta + \eta \cos^2 \theta)^{1/2}$$

where $$\rho = (\sin^2 \psi)(\Delta \theta)^2 \text{ and}$$

$$\eta = \frac{\cos^4 \psi}{\sin^2 \psi} \left( \frac{c^2 \tau}{2R} \right)$$

It can be seen from Equation 5 that an elevation angle $\psi$, pulse length $\tau$ and slant range $R$ can be chosen so that $\rho = \eta$. This makes the geometric Doppler spectrum width $\sigma_g$ insensitive to changes in the angle $\theta$ (since $\sin^2 \theta + \cos^2 \theta = 1$) and therefore not usable in the measurement of the drift angle $\theta_d$. By choosing a large enough elevation angle $\psi$ or slant range $R$, which can be accomplished by not depressing the antenna too far, $\eta$ can be made much smaller than $\rho$ so that the geometric Doppler spectrum is made dependent upon the angle $\theta$ and therefore dependent upon the drift angle $\theta_d$. It can also be seen from Equation 5 that as long as $\eta$ is made much smaller than $\rho$ and the angle $\theta$ is kept fairly large, that the effect on the spectrum width that is contributed by the $\sigma_{g_2}$ term of Equation 4 is substantially negligible. Therefore the geometric spectrum width $\sigma_g$ may be given by:

$$\sigma_g = \frac{2V}{\lambda} \sin \theta \sin \psi (\Delta \theta)$$

which is the same as Equation 3.1.

The antenna azimuthal beamwidth $\sin \psi (\Delta \theta)$ is equal to $k\gamma/D$ (in radians), where $D$ is the antenna aperture and $k$ is a system constant. Equation 3.1 may now be written as:

$$(6) \quad \sigma_g = \frac{2Vk}{D} \sin \theta$$

It has been found that the constant $2k$, called the Doppler calibration constant in the expression for $\sigma_g$, is a quantity which varies from system to system depending on antenna aperture illumination, the type of antenna and radome used, etc. In a typical Doppler system the constant has a value of about 1.2. The variation in the Doppler calibration constant $k$ has no effect on the measurement of velocity and drift angle, since it is a fixed quantity which may be accounted for in the system computer.

In the system of the present invention, a fixed tracker is utilized. The fixed spectrum width tracker is designed to produce a predetermined D.C. voltage output for a given differential Doppler spectrum width. In a preferred embodiment of the invention, the predetermined output is made equal to zero volts for a given spectrum width and for greater or lesser widths, respective voltages of different polarity and magnitude are produced. The position of the radar antenna is controlled, by means of a suitable servo system, by the output of the tracker so that it is positioned in azimuth to an angle $\theta$ that will produce the spectrum width necessary to give a zero output from the tracker. It should be realized that other voltages may be used as the predetermined voltage by suitably designing the tracker and Doppler system. Thus, the antenna is slewed in azimuth until the width of the spectrum equals the spectrum width $\sigma_T$ to which the tracker is tuned for a zero output.

It can be seen from Equation 6 that $V$ and $\theta$ are uniquely related; that is, for any $\theta$, within the operating range, there is one, and only one aircraft velocity for which $\sigma_g = \sigma_T$. We define the $\theta$ angle that makes $\sigma_g = \sigma_T$ as $\theta_0$ so that $$(7) \quad \sigma_T = k' \frac{V}{D} \sin \theta_0$$

If there were no drift angle (the angle between the horizontal projection of the velocity vector and the longitudinal axis of the aircraft) present, then a single measurement of $\theta_0$ would be sufficient to determine the ground velocity.

In the case of no drift, $\theta_0$ is a measurable angle because of the coincidence of the aircraft axis and the velocity vector. In the case of drift, $\theta_0$ is not a measurable angle because the position of the velocity vector with respect to the aircraft axis is not initially known; antenna azimuthal angles can only be measured with respect to the aircraft axis. Thus with drift, a measurement of the azimuth angle of the beam relative to the aircraft axis is not sufficient to determine both the drift angle and the ground velocity. However, these two quantities can be measured by allowing the antenna to be driven to two different azimuth angles $\theta_1$ and $\theta_2$—one on either side of the velocity vector such that the resulting Doppler spectrum width of the return video signals are $\sigma_T$.

FIGURE 10 is a plot in the horizontal plane of the velocity vector, of the aircraft axis, and the two beam positions resulting in $\sigma_T$. It is apparent from FIGURE 10 that with a drift angle $\theta_D$, $\theta_0$ no longer equals the angles $\theta_1$, $\theta_2$ that can be measured in the aircraft frame of reference. From FIGURE 10, however, it is obvious that $$(8) \quad \theta_0 = \theta_2 + \theta_D$$

$$(8.1) \quad \theta_0 = \theta_1 - \theta_D$$

If Equations 8 and 8.1 are added, $\theta_0$ can be shown to be $$(9) \quad \theta_0 = \frac{\theta_1 + \theta_2}{2}$$

Using Equation 7, then $$(10) \quad \sigma_T = k' \frac{V}{D} \sin \frac{\theta_1 + \theta_2}{2}$$

in which $\theta_1$, $\theta_2$ are the measured azimuth angles of the beam. The aircraft velocity would then be:

$$(11) \quad V = \frac{\sigma_T D}{k} \csc \frac{\theta_1 + \theta_2}{2}$$

To obtain the drift angle $\theta_D$, subtract Equation 8.1 from Equation 8 and the following result will be obtained:

$$(12) \quad \theta_D = \frac{\theta_1 - \theta_2}{2}$$

Equations 11 and 12 show that the measurement of two angles $\theta_1$ and $\theta_2$ are sufficient to permit the calculation of the aircraft ground velocity and drift angle.

In order to solve for the velocity and drift angle, it is necessary that an accurate measurement be made of $\sigma_g$, the Doppler spectrum width. In a preferred form of the invention, this is accomplished by the filter-detector (tracker) arrangement 29 shown in FIG. 4. The video signal from the second detector of the radar receiver, which contains the Doppler spectrum, is applied to the inputs of three filters 20, 21, and 22. The passband characteristics for each of these filters is shown in FIGURE 4b. As can be seen, filter 20 is effectively a lowpass filter, and filter 21 and 22 are bandpass filters. Superimposed on the filter characteristics of FIGURE 4b for comparison purposes is one-half of the Doppler spectrum 19 of FIGURE 3b.

The output of filters 20 and 22 are connected to a summing network 24 which effectively makes filters 20 and 22 a single filter having the bandpass characteristics shown for the two individual filters. This result may also be accomplished by constructing a single filter having the passband characteristics of filters 20 and 22. The output of the summing network 24 is connected to the input of a detector circuit 25 and the output of the bandpass filter 21 is connected to the input of another detector circuit 26. The detector circuits 25 and 26 demodulate the A.C. components at the output of the respective filters and produce a D.C. voltage which is representative of the energy of the signals passed by the respectively connected filter or filters. The detectors 25 and 26 may be any suitable energy detector, for example, a bolometer or a diode demodulator, etc. The outputs of the detectors 25 and 26 are connected to a difference circuit 27 which takes the difference of the output voltages out of the detectors 25 and 26. The output signal from the difference network 27 is supplied to a smoothing circuit 28, which is a filter circuit of the low pass type used for averaging the applied input signal over a period of time to give better system accuracy.

Figure 4A:
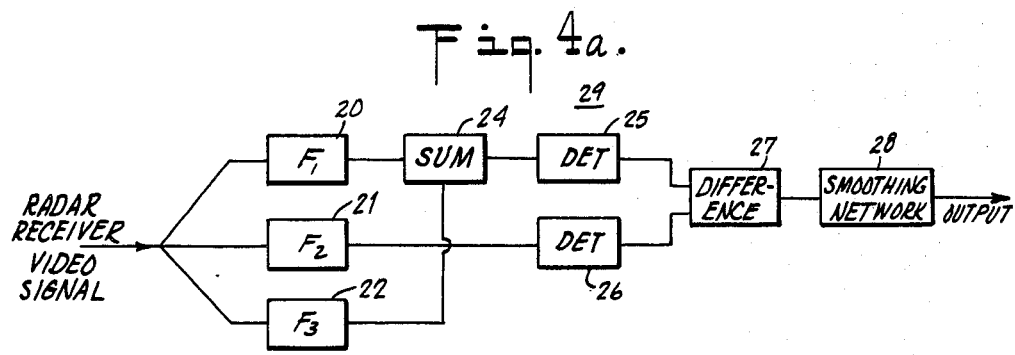
FIGURE 4a is a schematic representation of one form of a frequency tracker.
Figure 4B:
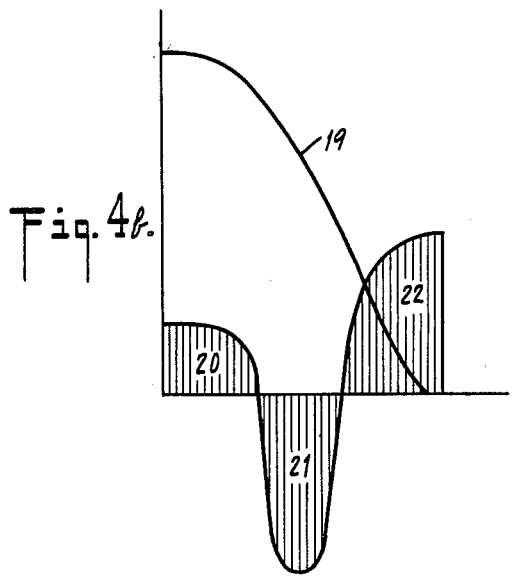
Figure 4C:
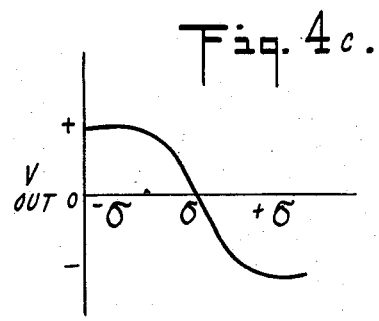

FIGURE 4c shows the output voltage of the smoothing circuit 28 for a typical tracker. It can be shown mathematically that various arrangements of filters 20, 21, and 22, having different passband characteristics, can be provided which produce a zero (null) output voltage (error voltage) at the output of the smoothing circuit 28 for a spectrum of a particular width $\sigma$. If the width of the spectrum measured by a particular tracker is greater than or less than the spectrum width for which the tracker was designed to produce a null output, a respective negative or positive voltage is produced at the output of the smoothing circuit 28. For example, suppose the tracker is designed to produce a null output at a frequency of 250 cycles per second. When a Doppler spectrum of a width of 250 cycles is supplied to the input of the filters, then the output of the smoothing circuit 28 is 0 volts. However, consider the case where the Doppler spectrum produced at the output of the radar receiver second detector is only 100 cycles per second. In this case, as shown in FIG. 4c, the output of the smoothing circuit 28 is a positive voltage which indicates that the differential Doppler spectrum width is narrower than the spectrum to which the tracker is tuned. On the other hand, if the spectrum supplied to the input of the filters is greater than 250 cycles per second, a negative voltage is produced at the output of the smoothing circuit 28, indicating that the differential Doppler spectrum width is wider than the specrum width to which the tracker is tuned.

It may be calculated mathematically that a certain arrangement of filters having various characteristics, for a particular tracker, produces a zero voltage output for a certain Doppler spectrum width. For non-zero tracker output voltages, the output voltage is linear when the spectrum being measured is within a certain range on either side of the null spectrum width. If the range of spectrum to be measured is small enough, then a fixed tuned tracker may be used to measure any spectrum width within this range, merely by calibrating the tracker output. For any given set of conditions such as anticipated range of spectra widths, "white" noise level, desired smoothing time, etc., a set of filters may be constructed which will produce the desired null output. The derivation of the calculations of optimum tracker filters having minimum smoothing time are set forth below.

Let $s(\omega)$ be the differential Doppler power spectrum to be measured, including both the signal and white noise, i.e., $s(\omega)$ is the spectrum of the input to the tracker. Then the following relations hold:

(a) If $K_{dc}$ represents the D.C. sensitivity of the tracker (defined as the rate of change of tracker D.C. output with respect to the fractional change in input spectral width) then

(13) $$K_{dc} = \int_0^{\omega_0} G(\omega)\omega \frac{ds(\omega)}{d\omega} d\omega$$

where $G(\omega)$ is the power transfer function of the tracker filter (strictly, G is the difference of the transfer functions of the two "branches" of the tracker filter of FIG. 4a, filters 20 and 22 forming one branch and filter 21 forming the scond branch). The angular frequency $\omega_0$ is the highest frequency in the differential Doppler spectrum accepted by the tracker.

(b) If $V_{ac}$ is the R.M.S. fluctuation in the smoothed output of the tracker, the smoothing being accomplished by an ideal low pass filter whose cut-off angular frequency is $\omega_c$, then

(14) $$V_{ac} = \left[ \omega_c \int_0^{\omega_0} G^2(\omega) s^2(\omega) d\omega \right]^{1/2}$$

In terms of the smoothing time T, defined by $$T = \frac{1}{2f_c} = \frac{\pi}{\omega_c}$$

we have

(15) $$V_{ac} = \left[ \frac{\pi}{T} \int_0^{\omega_0} G^2(\omega) s^2(\omega) d\omega \right]^{1/2}$$

Now consider the ratio J defined by

(16) $$J = \frac{K_{dc}}{V_{ac}}$$

As soon as we specify the minimum fractional change in input spectral width $\sigma$ that we wish to detect, then J is uniquely determined, independently of the characteristics of the tracker filter. To see this, let the criterion of detectability be equality of the A.C. output and the change in D.C. output. Let

(17) $$V_{ac} = \frac{\delta\sigma}{\sigma} K_{dc}$$

or

(18) $$J = \frac{1}{\frac{\delta\sigma}{\sigma}}$$

Thus if we wish to detect at least a 1% change in spectral width, we must have $J=100$ no matter what tracker filter is used.

Now from Equations 13, 15, and 16, we have

(19) $$J = J'\sqrt{T}$$

where

(20) $$J' = \frac{\int_0^{\omega_0} G(\omega)\omega \frac{ds(\omega)}{d\omega} d\omega}{\left[ \pi \int_0^{\omega_0} G^2(\omega) s^2(\omega) d\omega \right]^{1/2}}$$

For a system which can detect a 1% change in spectral width, we therefore have

(21) $$T = \frac{10,000}{J'^2}$$

If we define the optimum tracker filter as that one which for a fixed T maximizes J, it follows from Equation 19 that it also maximizes J'. If such a filter is then put into a system whose J is determined in advance ($J=100$, for example) it is seen from Equation 21 that this filter will minimize T for this system. Thus the optimum filter may be thought of as maximizing J for a fixed T or minimizing T for a fixed J. The second description corresponds to our application of getting the shortest possible smoothing time.

The optimization of the tracker filter is in practice subject to one or more side conditions or constraints. These are, (1) for a particular input spectral width, say $\sigma_0$, the D.C. output of the tracker shall equal zero, and (2) if the input is pure white noise, the D.C. output shall equal zero (condition of white noise balance). If both of these conditions are imposed, then $G_1(\omega)$, the transfer of the optimum filter, is given by $$(22) \quad G_1(\omega) = \frac{\frac{ds(\omega)}{d\omega}}{s^2(\omega)} + \frac{a}{s^2(\omega)} + \frac{b}{s(\omega)}$$

where $a$ and $b$ are constants defined below. This result is obtained by means of the calculus of variations. The constants $a$ and $b$ are defined as $$(23) \quad a = \frac{\beta\omega_0 - \alpha\gamma}{\gamma^2 - \delta\omega_0}, \quad b = \frac{\delta\alpha - \gamma\beta}{\gamma^2 - \omega_0\delta}$$

where the constants $\alpha$, $\beta$, $\gamma$, and $\delta$ are in turn defined as follows:

$$(24) \quad \alpha = \int_0^{\omega_0} \omega \frac{ds(\omega)}{d\omega} d\omega$$

$$(25) \quad \beta = \int_0^{\omega_0} \omega \frac{\frac{ds(\omega)}{d\omega}}{s^2(\omega)} d\omega$$

$$(26) \quad \gamma = \int_0^{\omega_0} \frac{d\omega}{s^2(\omega)}$$

$$(27) \quad \delta = \int_0^{\omega_0} \frac{d\omega}{s^2(\omega)}$$

If the condition of white noise balance is not imposed, we have for $G_2(\omega)$, the transfer of the optimum filter, $$(28) \quad G_2(\omega) = \omega \frac{\frac{ds(\omega)}{d\omega}}{s^2(\omega)} - \frac{\alpha}{\omega_0} \frac{1}{s(\omega)}$$

where $\alpha$ is given by Equation 24.

Substituting $G_1(\omega)$ or $G_2(\omega)$ into Equation 20 and then substituting the resulting value of J' into Equation 21 obtains the smoothing time. This process yields the minimum smoothing time for a system capable of just detecting a 1% change in spectral width. If $T_1$ is the minimum time for a system with white noise balance, and $T_2$ is the minimum time for a system without white noise balance, the above substitutions give $$(29) \quad T_1 = \frac{10,000\pi}{\eta + \frac{2\alpha\beta\gamma - \beta^2\omega_0 - \alpha^2\delta}{\delta\omega_0 - \gamma^2}}$$

$$(30) \quad T_2 = \frac{10,000\pi}{\eta - \frac{\alpha^2}{\omega_0}}$$

where $\eta$ is $$(31) \quad \eta = \int_0^{\omega_0} \omega^2 \left[\frac{\frac{ds(\omega)}{d\omega}}{s(\omega)}\right]^2 d\omega$$

Equations 29 and 30 are used to compute the smoothing times. It should be noted that $\alpha$, $\beta$, $\gamma$, ... etc. all involve $s(\omega)$, which in turn contains the noise level as a parameter, so that $T_1$ and $T_2$ depend on the signal-to-noise ratio. Tables may be derived from these equations in which $X_0$, the ratio of the spectrum width, $\sigma_0$ (in cycles), to which the tracker is tuned for null output to the bandwidth of the tracker (in cycles) $\omega_0/2\pi$ is plotted. The upper limit to this latter bandwidth is one half the repetition frequency of the radar system. To exceed this limit involves the risk of spectrum overlap at high aircraft velocities. A plot of such tables for various values of $X_0$ and $\sigma_0$ show that the penalty in additional smoothing time that one must pay for white noise balance is negligible for many system parameters.

Consider a typical radar system which is operated at a 2000 cycle pulse repetition frequency, in which these parameters are a $\sigma_0$ of something larger than 240 cycles and an $X_0$ of 4. In this system, with a 10 db signal-to-noise ratio case, it can be shown that the penalty one pays in smoothing time for white noise balance is only 1.4 seconds and in a 20 db signal-to-noise ratio, this penalty decreases to 0.23 second. If the radar system is operated at a 2000 cycle pulse repetition frequency and with a $\sigma_0$ of 300 cycles, a 1% relative error velocity system with approximately a 1.5 second smoothing time may be obtained. This is adequate for a navigation system. Of course smaller relative errors can be obtained for longer smoothing times, the decrease in relative error going as the square root of the increase in smoothing time.

Figure 5A:
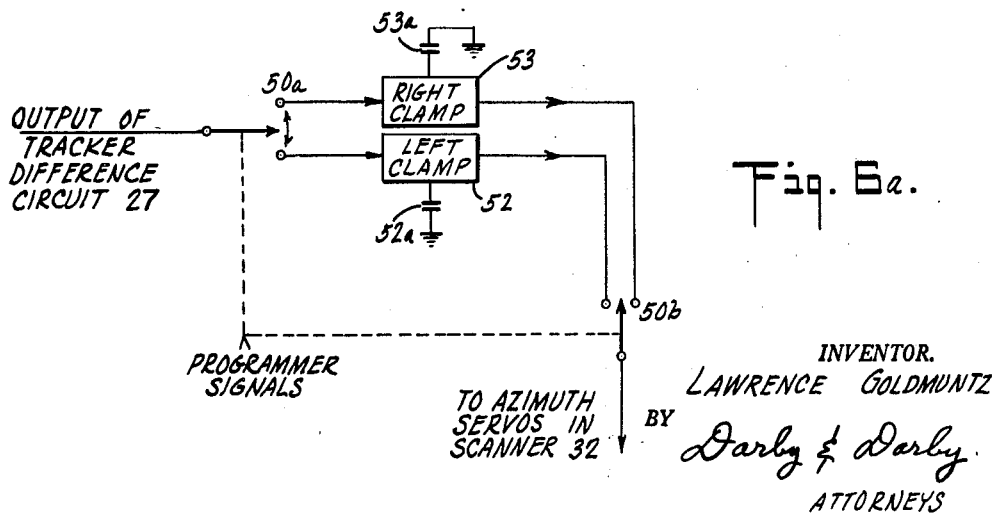
FIGURE 5 shows a schematic block diagram of a Doppler radar system utilizing the principles of the invention.

While the general principles of a Doppler radar system using a fixed tracker for measuring vehicle velocity and drift angle have been described above, reference is made to FIG. 5 which shows one embodiment of a Doppler radar system utilizing the principles of the invention. A search radar type system is shown in FIG. 5 which is adapted to make a Doppler measurement during a portion of the total search period. For example, consider in the system of FIG. 5 a search mode of 30 seconds is utilized and that approximately five seconds out of every thirty seconds of the search period are excised to obtain Doppler information. The five second interval includes the time required to depress the antenna from its search mode position to a position where the Doppler measurements may be made; to scan the antenna from side to side; and to elevate the antenna back to the proper position for search operation. In a typical system the five second interval is broken down to allow one second to depress the antenna from and to elevate it back to the search mode; one second to scan from one side to the other of the vehicle axis; and one and a half second intervals at each extremity of the scan, during which the antenna is stationary and during which the actual Doppler spectrum measurement is made by the tracker.

In FIG. 5 the radar antenna 30 is driven by the scanner elements 32. The antenna 30 is preferably of the type that is used for both transmitting and receiving. The scanner elements 32 are conventional drive motors, servos and synchros which are used to position the antenna with respect to the aircraft axis. These elements are well known in the art as are the systems for controlling them to make the antenna produce a predetermined scan pattern. Therefore, additional explanation is not necessary.

The scanner elements 32 are under the control of a scanner programmer and control circuit 34, which contains the electrical and electro-mechanical components needed to control the scanner circuits and to drive the antenna 30 in a predetermined scan pattern, for example, a multibar scan, etc. The programmer 34 produces and supplies the electrical signals to the scanner azimuth and elevation servos which are used to control the antenna drive motor and position and scan the antenna accordingly.

The signals picked up by the antenna 30, when it operates as a receiving antenna, are supplied to the receiver circuits of a conventional radar receiver 35. The radar receiver 35 has the duplexing circuits, mixers, intermediate frequency amplifiers, video amplifiers and other circuits which are necessary to form the video signal from the radiant energy which is received by the antenna 30. The particular types of radar receiver circuits used are not important to the present invention. The radar receiver 35 used, as does every conventional receiver, has a second detector at which the video output signal is present.

The video signal at the output of the radar receiver second detector is supplied to the input of a range gate circuit 37, which is under the control of signals from the radar synchronizer 39. The range gate and synchronizer units operate in a conventional manner and no further description is necessary. The video signal at the output of the range gate 37 is applied to the input of a scan gate circuit 41, and the output of the scan gate 41 is connected to the input of the tracker 29. The scan gate 41 receives an enabling pulse from the programmer 34 which opens the gate 41 only during the time when the antenna 30 is positioned to make a Doppler measurement. This insures that the video signal at the output of the scan gate 41 is supplied to the fixed tracker 29 only during the period when the antenna 30 is making a Doppler measurement.

As previously explained, the tracker 29 produces an output voltage which is proportional to the video signal Doppler spectrum width. This voltage is, in turn, dependent upon the position of the antenna 30. The output voltage from the tracker 29 is applied to the programmer 34 to control the scanner servos so that the antenna 30 is positioned, in azimuth, in accordance with the signals appearing at the output of the tracker 29, to a point where the Doppler spectrum width $\sigma_T$ is produced. This is preferably accomplished by a conventional servo loop.

The scanner 32 also has a synchro transmitter, or other similar device, which produces a signal representative of the antenna azimuth position. This is denoted in FIG. 5 as the azimuth gimbal angle. The azimuth gimbal angle is supplied to the input of a computer which calculates the vehicle velocity and drift angle. The computer 43 is also supplied with roll, pitch and attitude information from suitable sources 44, such as gyroscopes, if data stabilization is needed. The computer 43 forms no part of the present invention and any suitable computer may be utilized.

An example of the scanning cycle of the system of FIG. 5 is described below. Scanning switches in the programmer 34 are set up so that during the first portion of the Doppler measurement interval of the scanning cycle, the output voltage from the tracker 29 drives the antenna 30 towards the left of the vehicle axis. The width of the Doppler spectrum, which is measured by the tracker 29, produces a voltage which is dependent upon the angle $\theta$ of the antenna 30 with respect to the aircraft axis. This voltage is supplied back to the programmer 34. The polarity and magnitude of the tracker voltage is such as to drive the antenna to, and maintain it in the proper azimuthal position. The scan to the left continues until such time as the Doppler spectrum width of the received echo equals the spectrum width $\sigma_T$ for which the tracker produces a zero, or other predetermined, output voltage. With a null output from the tracker, there is no excitation for the scanner servos and the antenna is automatically maintained for a predetermined period at the azimuthal position that causes a null output from the tracker. At the end of this predetermined period a synchro system transmits a voltage back to the programmer 34 which is representative of the angle between the vehicle axis and the left azimuthal position of the antenna. This angle, for example, is shown in FIGURE 10 as $\theta_2$. This signal is transmitted from the programmer 34 to the drift and velocity computer 43.

After the angular measurement to the left has been made, the antenna 30 is then caused to scan to the right of the vehicle axis by the programmer 34. When the antenna has moved from its position to the left of the axis somewhat to the right of the axis, the output of the spectrum width tracker 29 is reversed in polarity so as to provide a signal to the programmer 34 and the scanner 32 that drives the antenna 30 to the right of the axis until the spectrum width of the received echo again equals the $\sigma_T$ setting of the tracker 29 and produces a null output voltage therefrom. In the same manner as before, the antenna 30 is maintained at this position and a signal which is representative of the angle to the right of the axis is transmitted to the drift and velocity computer 43. This signal would be representative, for example, of the angle $\theta_1$ in FIGURE 10.

The computer 43 is also supplied with roll, pitch and attitude information from the vehicle navigation system 44 which, for example, may be a conventional auto pilot. The navigational information is used along with the signals representative of the azimuth angles to the left and right of the vehicle axis at which tracker null output voltages were produced, in order to determine the drift angle and the velocity. As previously shown, the sum of the left and right azimuthal angles is proportional to the vehicle velocity along the ground track and the difference between these two angles is proportional to the drift angle.

In a preferred form of the invention using the system of FIG. 5, a five second interval is excised from a thirty second search period in order to obtain the Doppler spectrum width information. It has been found that by using a five second Doppler measurement interval, ground speed information accurate to within one percent and drift angle information accurate to within 0.5° is obtained. The positioning of the antenna at the azimuth angle where a zero output voltage from the tracker is obtained, for the one and a half seconds contemplated, allows adequate time for the smoothing circuit 28 to operate and produce the desired accuracy.

It should be realized, that the interruption of the search mode once every thirty seconds may not be necessary in many applications. The actual number of times per given unit time that a Doppler measurement must be made and the interval necessary for such measurement, in order to obtain accurate drift and velocity information, depends upon the statistics of wind fluctuations, variations in vehicle velocity, the type of radar system utilized, etc.

In some applications it is desirable not to interrupt the antenna search operation but to utilize a portion of it for obtaining the Doppler information. One type of radar system in which the interruption would not be desirable is that which utilizes a multi-bar scan. Multi-bar scan radar systems are in general use in the fire control systems of high speed aircraft which are used to intercept targets moving at high velocities. In these radar systems, which are of the incoherent type, each bar of the multi-bar search scan is scanned at a high rate of speed, which is limited by the capabilities of the scanner servos. In this type of system it is advantageous to sequentially extract Doppler information from the lowest bar of the multi-bar search scan in order not to adversely affect the system's search capabilities.

FIGURE 6 shows a sequential system wherein the Doppler information is abstracted from the lowest bar scan of a multi-bar search scan and the search mode is not excessively interrupted. Those elements which perform the same function as the elements of the system of FIGURE 5 are designated with the same reference numerals.

In the sequential system shown in FIGURE 6, the output of the fixed frequency spectrum width tracker 29 is connected to the input of a scan switch 50. Scan switch 50 is a suitable electrical, electro-mechanical, or electronic switch which is under the control of signals supplied from the programmer 34.

In a system utilizing a multi-bar scan it is desirable to make the Doppler measurement as rapidly as possible and thereby maintain most of the search mode period intact. The right and left clamp circuits 52 and 53 are therefore used as reference sources which position the antenna to the angle measured on the preceding Doppler measurement for which there was null tracker voltage output. In this manner, there is no time wasted in moving the antenna 30 through a complete range of angles in order to obtain the zero tracker output voltage. All that is done is to change the azimuth angle of the antenna the necessary amount from the preceding measurement.

Referring to FIGURE 6a, the operation of the clamp circuits 52 and 53 is explained in greater detail. When the antenna 30 is scanning the lowest bar of the multi-bar scan, it is positioned, by means of signals supplied to the scanner servos from the programmer 34, at a relatively large vertical deflection angle $\psi$. Therefore the conditions of Equation 6 are satisfied. As the scan programmer 34 drives the antenna to the left of the vehicle axis on the lowest bar of the scan, the programmer 34 sends a signal to a scan switch 50 so that the switch section 50b connects the output of the left clamp 52 to the input of the scanner azimuth servo. As previously described, the azimuth servo controls the angular azimuthal position of the antenna 30 with respect to the vehicle axis. Clamp circuits 52 and 53 have stored therein signals which are representative of the angular position of the antenna on the preceding lower scan bar at which the Doppler measurement made produced a null output voltage from the tracker 29. Any suitable circuit to accomplish this storage may be utilized for the clamp circuits 52 and 53. One such circuit comprises the respective capacitors 52a and 53a upon which a charge is stored which is proportional to the antenna azimuthal position for tracker null output voltage.

Continuing with the explanation of the circuit of FIGURE 6a, at the same instant that the output of the left clamp 52 is connected to the scanner azimuth servo, the output of the frequency tracker 29 is connected to the input of the left clamp circuit 52 by section 50a of the scan switch. If the velocity or the drift angle of the vehicle has not changed from the preceding Doppler measurement, the antenna 30 is in the correct azimuth position and there is zero output voltage from the spectrum tracker 29. Therefore, no charge is transferred to the clamping capacitor 52a. However, if the velocity or drift angle has changed, the azimuth position of the antenna 30 from the preceding Doppler measurement, as determined by the voltage on the clamp capacitor 52a, is incorrect to produce a zero output voltage. Therefore, there is an output voltage from the spectrum tracker 29 which alters the charge and potential of the clamping capacitor 52a. This charge on the clamping capacitor 52a produces a signal which is relayed through the programmer 34 to the scanner servos. This signal changes the position of the antenna 30 in a direction to produce zero tracker voltage output.

After a short interval in the left position, the programmer 34 causes the scan switch 50 to disconnect the output of the tracker 29 from the left clamp circuit 52. The programmer 34 then starts the antenna 30 moving towards the right. When the programmer 34 has supplied signals which are effective to move the antenna sufficiently far enough to the right to a point where the programmer driving signals on the scanner servo approximately equals the potential of the right clamping circuit 53, the programmer 34 provides a signal for the scan switch 50 which makes the switch section 50b connect the azimuth scan servo to the output of the right clamping circuit 53. At the same time, scan switch section 50a connects the output of the tracker 29 to the input of the right clamping circuit 53. This condition is maintained for an interval of time during which the output of the tracker 29, if necessary, charges the clamping capacitor 53a in a direction to correct any azimuth position error and to position the antenna 20 at an angle which produces zero output voltage from the tracker. After this short interval of time, the scan programmer resumes the multi-bar scan pattern for the search mode of operation. This action is repeated during the lower bar of each successive search scan.

It should be recognized that the system described in FIGURE 6 is of the sample data servo type. The antenna 20 does not rest long enough during the one bar sample of the Doppler mode to obtain the desired quality of information. However, on each successive sample the quality of information stored on the clamping capacitors 52a and 53a improves. This is a system that obtains the necessary smoothing time for the desired accuracy by taking measurements over a succession of smaller intervals and storing the results between measuring periods. This type of system is one which compromises a search mode of operation the least, other than a system which provides separate components for making the Doppler measurements.

In describing the system of FIGURE 6 it has been assumed that the scanner servos are provided with signals which are proportional to the position to which the antenna is to be positioned. These are required in order to position the antenna at a point corresponding to the potential on the clamping capacitors 52a and 53a. If these potentials are not actually available, they can be made available, by the use of suitable reference amplifiers which would supply the signals to the scanner servos. It should be noted that in the sample data servo system of FIGURE 6, it is possible to break the smoothing time of a few seconds, normally required by the smoothing circuit 28, into smaller intervals and thereby disturb the search mode for a smaller interval of time than for the system described in FIGURE 5.

Another embodiment of a Doppler radar system utilizing the principles of the invention is shown in FIGURE 7. Using the system parameters ordinarily employed in radars for high speed interception aircraft, it may be derived that the optimum tracker needed to measure drift angle is a narrow bandpass filter whose center frequency is located on the skirt of the Doppler spectrum 19. It may also be derived that the optimum tracker needed for the measurement of vehicle velocity is different from that needed for the measurement of drift angle. It may also be shown that the smoothing time required for a drift angle measurement to within an accuracy of 0.5 degree is smaller than the smoothing time required for measuring the velocity to an accuracy of 1%. FIGURE 7 is a schematic diagram of a system that uses separate filtering circuits in order to accomplish the measurement of drift and velocity. The components of the system of FIGURE 7 which are the same as the components of the system previously described have been designated with the same reference numerals.

In the system of FIGURE 7, in order to measure the drift angle, the video output signal from the second detector of the radar receiver 35 is passed through a range gate 37 and into AGC amplifier 40. The output of the amplifier is supplied to the input of a narrow band Doppler circuit 57. The AGC amplifier normalizes the input to the radar receiver and ensures that the amplitude of the signals which are detected is the same, even if different types of terrain are scanned to the left and to the right of the vehicle axis. This makes the system insensitive to amplitude variations of the received signals.

The narrow band Doppler circuit 57 is formed by a bandpass filter and an associated amplifier whose passbands are sharply tuned to a fixed frequency on the skirt of the Doppler frequency spectrum 19. The output of the narrow band amplifier is applied to a suitable detector which produces a D.C. signal representative of how much of the skirt of the Doppler frequency spectrum 19 falls within the passband of the filter. When the measured Doppler spectra on each side of the vehicle axis are the same, the same portion of the skirt is detected by the circuit 57 and its output signals will be the same.

The output of the Doppler circuit 57 is applied to the input of a first scan gate 58 to control its operation. The scan gate 58, when opened, permits the received radar signal to excite a sector scan comparison circuit 60 while the antenna 20 is scanning certain equiangular sectors $\Delta\theta_1$, on either side of an assumed aircraft heading. The assumed heading is set into the antenna controller of the scanner 32.

Referring to FIGURE 8, the sector scan of the antenna is shown in schematic form. The assumed aircraft heading line 62 lies along the terrain over which the vehicle is passing. When the antenna 20 is scanning the sectors $\Delta\theta_1$, on each side of the assumed aircraft heading 62, the scan gate 58 is closed since the skirt of the Doppler spectrum does not lie within the range of the narrow band circuit 57. When the antenna scans the equi-angular increments $\Delta\theta_1$ on each side of the assumed heading line 62, the signal produced at the output of the narrow band circuit 57 is sufficient to open the scan gate 58 so that the sector scan comparison circuit 60 is enabled.

The sector scan comparison circuit 60 produces an output signal which is used to correct the assumed aircraft heading 62. This signal is applied to the scanner programmer 34 so that the complete antenna scan is shifted, i.e., the assumed aircraft heading 62 is changed.

The sector scan comparison circuit 60 is shown in detail in FIGURE 7a. The scanner programmer 34 provides signals which drive a suitable mechanical, electromechanical or electronic switch 63 in the scan gate 58. The switch connects the output of the narrow band circuit 57 to an appropriate smoothing circuit in accordance with the position of the antenna 30 on a particular side of the vehicle axis. When the antenna is to the left of the axis, the switch 63 connects the output of the narrow band circuit 57 to the input of the left smoothing circuit, which is formed by a resistor 65a and a capacitor 66a. When the antenna 20 is positioned to the right of the axis, the switch 63 connects the output of the narrow band circuit 57 to the input of the right smoothing circuit, formed by resistor 65b and capacitor 66b. The resistor 65a and 65b are of equal value. The capacitors 66a and 66b are of equal value and both have one end connected to a source of reference potential such as ground 67. The other ends of the capacitors are connected through a resistor 68, which has a center tapped output line 69. The output at the center of resistor 68 is the difference between the voltages stored on the respective capacitors 66a and 66b. Therefore, when the Doppler spectrum skirts measured on each side of the aircraft axis are different, and output voltage is produced at the center tap 69. When the skirts measured are the same, there is no output voltage.

The output voltage on line 69 is supplied to the scanner programmer 34 which controls the excitation of the antenna servos. When the output of the sector scan comparison circuit 60 is zero, i.e., the narrow band filter 57 produces the same output voltage for the same skirt width measured on each side of the axis, the antenna 30 scans symmetrically about the vehicle velocity vector 12, which is the vehicle heading.

When there is zero output voltage from the sector scan comparison circuit 60 and the antenna 30 is scanning equi-angular sectors on each side of the vehicle heading, the scanner programmer 34 provides a signal which opens a second scan gate 70. At the same time the programmer causes the antenna 30 to stop momentarily at the extremities of each scan of a $\Delta\theta_1$ sector. When the antenna is stationary at the extremes of its scan, and the scan gate 70 is opened, a signal at the output of the range gate 37 is applied over line 72 to the input of a fixed spectrum width tracker 29 through the scan gate 70. The tracker 29 functions in the same manner as the trackers described previously. In this embodiment of the invention, the tracker 29 furnishes velocity information only.

When the angular magnitude of the antenna sector scan is correct, i.e., the extremity of the angular scan is correct, there is a null output from the fixed spectrum width tracker 29. However, when the antenna is scanning too far to either side of the vehicle heading, the output of the fixed spectrum width tracker 29 is at one polarity and when the antenna is not scanning far enough, the output is of the opposite polarity. This voltage characteristic is shown in FIGURE 4c. The output of the tracker 29 is supplied to the antenna servos through the programmer 34.

Thus the signal from the output of the tracker 29 is used to determine the angular extent of the sector scan about the aircraft heading, the heading being determined by the sector scan comparison circuit 60. When the output of the spectrum tracker 29 is a null, the signal from the programmer 34 contains information of both the angular magnitude of the sector scan (from the tracker 29 for velocity information) and the azimuth angle with respect to the vehicle axis about which the sector scan is being made (from the narrow band circuit 57, for drift information). This signal is supplied to the drift and velocity computer 43 which also receives suitable roll, pitch and attitude information for data stabilization, if required, and the vehicle drift and velocity are determined.

In some applications of radar systems, the tactical requirements are such that no time can be excised from the search mode to perform the Doppler search measurements. One such case is in some high speed interceptor flight profiles where the interceptor is climbing toward a fixed point or rendezvous and its search raster must be above its horizon. Therefore, it is desirable to simultaneously provide air-to-air search information and Doppler information.

In order to accomplish the simultaneous Doppler measurements and search operation, any of the suggested interconnections between the fixed spectrum width tracker 29 and the scanner 30 described with respect to the systems of FIGURES 5, 6 and 7, can be used if the Doppler information is provided from another source. FIGURE 9 shows an antenna which is capable of radiating two beams of energy, one beam being used for search, or other, information, such as fire control, and the other beam being used for transmitting and receiving energy for the Doppler measurement. This antenna has a parabolic reflector 75, a feed horn 77 and a pill-box feed 78. A ridge line connector feed 80 is also provided. The antenna of FIGURE 9 produces two beams, one beam 82 is the main beam which is utilized for search information. The second beam 84 is offset from the main beam and is used to obtain a continuous Doppler measurement. The energy returned from the offset beam 84 is utilized for a continuous Doppler measurement in the manner previously described.

A single antenna, such as the one shown in FIGURE 9, may be used provided that it is possible to adequately modify the magnitude of the azimuth search scan and the axis about which the scan is performed on the bar scans that are being used to simultaneously provide air-to-air search information and Doppler information. If it is not possible, due to tactical requirements, to modify the azimuth search scan extent or the center line (assumed heading line) of the search scan in any way, then only the sampled data servo system shown in FIGURE 6 can be used. In the system of FIGURE 6, only the lower bar of the scan is used for Doppler information.

In summary, if Doppler and search information are to be obtained simultaneously, only the azimuth scan of the air-to-air search raster need be modified, if the interconnections of the systems of FIGURES 5 and 7 are used. No modifications are necessary in the antenna search raster (as long as the search raster scans to a sufficiently large angle on each side of the vehicle velocity vector 12) if the system of FIGURE 6 is used.

Another way of obtaining simultaneous search and Doppler information is to use the output of the tracker as a gating pulse. In this system, the output of the scanner azimuth synchro transmitter is applied to one input of a gate circuit. The gate is opened by the tracker output signal when it is at or near the null point. The synchro output signal of the gate circuit may then be supplied to left and right integrator circuits which would average out the synchro signals over a number of measurements, in order to obtain an accurate positional signal.

In another type of system for obtaining simultaneous search and Doppler information, the signal from the tracker may again be used as a gating pulse which would be generated when the signal was a null. The phase of the gating pulses generated by tracker to the left and right of the vehicle could then be compared, using the vehicle axis as a reference, in order to obtain the antenna positional information.

The fixed tracker Doppler system of the present invention has many advantages. Included among these is simplicity of tracker design since a number of variable filter circuits do not have to be constructed for the tracker 29. Only one tracker is constructed to produce a null, or other predetermined, voltage output for a fixed bandwidth Doppler spectrum and the antenna is positioned to produce that bandwidth spectrum. Another advantage obtained in utilizing the fixed tracker is that for any given accuracy limitations an optimum filter tracker may be designed to provide the shortest possible smoothing time. The realization of a short smoothing time is most important from the point of view of minimizing the interruption of the search mode and one way to shorten the smoothing time is to use only a single filter which does not have to scan. It may be shown that under certain conditions with a single optimum tracker, the performance of an incoherent Doppler radar system may be made to equal that of a coherent Doppler radar system.

While a preferred embodiment of the invention has been described above it will be understood that this embodiment is illustrative only and the invention is to be limited solely by the appended claims.

What is claimed is:

1. In a vehicle which moves with respect to terrain the combination comprising first means for transmitting a beam of energy and for receiving the portion of said beam of energy reflected from said terrain, means for forming the Doppler spectrum of said received energy, the frequency width of said Doppler spectrum being a function of the position of the first means with respect to the axis of the vehicle, and means for positioning said first means with respect to said vehicle axis so that a Doppler spectrum having a certain frequency width is formed.

2. In a vehicle which moves with respect to terrain the combination comprising first means for transmitting a beam of energy and for receiving the portion of said beam of energy reflected from said terrain, means for forming the Doppler spectrum of said received energy, the frequency width of said Doppler spectrum being a function of the position of the first means with respect to the axis of the vehicle, means for positioning said first means with respect to said vehicle axis so that a Doppler spectrum having a certain frequency width is formed, and means for representing the azimuthal angle of said first means with respect to said vehicle axis when said first means is at a position such that said spectrum of said certain width is formed.

3. In a vehicle which moves with respect to terrain the combination comprising means for transmitting a beam of energy and for receiving the portion of said beam of energy reflected from said terrain, means for forming the Doppler spectrum of said received energy, and means for measuring the frequency width of said Doppler spectrum, said last named means producing a predetermined signal in response to a Doppler spectrum of a certain frequency width and signals other than said predetermined signal in response to Doppler spectra different from said certain frequency width.

4. In a vehicle which moves with respect to terrain the combination comprising means for transmitting a beam of energy and for receiving the portion of said beam of energy reflected from said terrain, means for forming the Doppler spectrum of said received energy, the frequency width of said Doppler spectrum being a function of the position of the transmitting and receiving means with respect to the vehicle axis, means for measuring the frequency width of said Doppler spectrum, said last named means producing a predetermined signal in response to a Doppler spectrum of a certain frequency width and signals other than said predetermined signal in response to Doppler spectra different from said certain frequency width, and means responsive to the signals from said measuring means for changing the position of said transmitting and receiving means until a Doppler spectrum is formed having said certain frequency width.

5. In a vehicle which moves with respect to terrain the combination comprising means for transmitting a beam of energy and for receiving the portion of said beam of energy reflected from said terrain, means for forming the Doppler spectrum of said received energy, the frequency width of said Doppler spectrum being a function of the position of the transmitting and receiving means with respect to the vehicle axis, means for measuring the frequency width of said Doppler spectrum, said last named means producing a predetermined signal in response to a Doppler spectrum of a certain frequency width and signals other than said predetermined signal in response to Doppler spectra different from said certain frequency width, means responsive to the signals from said measuring means for changing the position of said transmitting and receiving means until a Doppler spectrum is formed having said certain frequency width, and means for determining the azimuthal angle of said transmitting and receiving means with respect to said vehicle axis when said predetermined signal is produced.

6. In a Doppler radar system adapted for use in a moving vehicle the combination comprising, an antenna for transmitting a beam of energy and for receiving said transmitted beam after reflection, said antenna being moveable with respect to said vehicle axis, means for forming the Doppler spectrum of said received beam of energy, the frequency width of said Doppler spectrum being related to the position of the antenna with respect to the vehicle axis, means for measuring the frequency width of said Doppler spectrum, said last named means producing a predetermined signal in response to a Doppler spectrum of a certain frequency width and signals other than said predetermined signal in response to Doppler spectra different from said certain frequency width and means responsive to the signals from said measuring means for moving said antenna to an angular position with respect to the longitudinal axis of said vehicle so that said Doppler spectrum of said certain frequency width and said predetermined signal are produced.

7. A Doppler radar system as set forth in claim 6 wherein said antenna has means for producing a separate beam of energy for use in forming the Doppler spectrum.

8. In a Doppler radar system adapted for use in a moving vehicle the combination comprising, an antenna for transmitting a beam of energy and for receiving said transmitted beam after reflection, said antenna being moveable with respect to said vehicle axis, means for forming the Doppler spectrum of said received beam of energy, the frequency width of said Doppler spectrum being related to the position of the antenna with respect to the vehicle axis, means for measuring the frequency width of said Doppler spectrum, said last named means producing a predetermined signal in response to a Doppler spectrum of a certain frequency width and signals other than said predetermined signal in response to Doppler spectra different from said certain frequency width, means responsive to the signals from said measuring means for moving said antenna to an angular position with respect to the longitudinal axis of said vehicle so that said Doppler spectrum of said certain frequency width and said predetermined signal are produced, and means for determining the azimuthal angle of said antenna with respect to said vehicle when said predetermined signal is produced.

9. A Doppler radar system as set forth in claim 8 wherein said antenna has means for producing a separate beam of energy for forming the Doppler spectrum.

10. In a vehicle which moves with respect to terrain the combination comprising an antenna for transmitting a beam of energy and for receiving the portion of said beam reflected from said terrain, said antenna being moveable and repetitively scanning a pattern with respect to the axis of said vehicle, means for forming the Doppler spectrum of said received energy, the frequency width of said Doppler spectrum being a function of the position of the antenna with respect to the axis of the vehicle, means for positioning said antenna during a portion of a scanning pattern at a first position with respect to said vehicle axis so that a Doppler spectrum having a certain frequency width is formed, means for determining said first position and for producing a signal representative thereof, and means responsive to said last named signal during the next scanning pattern of said antenna to position the antenna at said first position at the start of the portion of said next scanning pattern during which the antenna is positioned to produce the spectrum having the certain frequency width.

11. In a vehicle which moves with respect to terrain the combination comprising an antenna for transmitting a beam of energy and for receiving the portion of said beam reflected from said terrain, said antenna being moveable and repetitively scanning a pattern with respect to the axis of said vehicle, means for forming the Doppler spectrum of said received energy, the frequency width of said Doppler spectrum being a function of the position of the antenna with respect to the axis of the vehicle, means for measuring the frequency width of said Doppler spectrum, said last named means producing a predetermined signal in response to a Doppler spectrum of a certain frequency width and signals other than said predetermined signal in response to Doppler spectra different from said certain frequency width, means responsive to the signals from said measuring means for positioning said antenna during a portion of a scanning pattern at a first position with respect to said vehicle axis so that a Doppler spectrum having said certain frequency width is formed, said positioning means including means responsive to the signals from said measuring means for positioning said antenna at said first position at the start of the portion of the next scanning pattern during which the antenna is positioned to produce the Doppler spectrum having the said certain frequency width.

12. In a vehicle which moves with respect to terrain the combination comprising an antenna for transmitting a beam of energy and for receiving the portion of said beam reflected from said terrain, said antenna being moveable and repetitively scanning a pattern with respect to the axis of said vehicle, means for forming the Doppler spectrum of said received energy, the frequency width of said Doppler spectrum being a function of the position of the antenna with respect to the axis of the vehicle, means for measuring the frequency width of said Doppler spectrum, said last named means producing a predetermined signal in response to a Doppler spectrum of a certain frequency width and signals other than said predetermined signal in response to Doppler spectra different from said certain frequency width, means responsive to the signals from said measuring means for positioning said antenna during a portion of a scanning pattern at a first position with respect to said vehicle axis so that a Doppler spectrum having said certain frequency width is formed, means for determining said first position and for forming a signal representative thereof, and means operative during the portion of the scanning pattern in which the Doppler spectrum of said certain frequency width is formed and responsive to said last named signal for positioning said antenna at said first position at the beginning of said portion of the next scanning pattern and responsive to the other signals from said measuring means for positioning said antenna at a point with respect to the vehicle axis where said measuring means produces said predetermined signal.

13. In a vehicle which moves with respect to terrain the combination comprising an antenna for transmitting a beam of energy and for receiving the portion of said beam reflected from said terrain, said antenna being moveable and repetitively scanning a pattern with respect to the axis of said vehicle, means for forming the Doppler spectrum of said received energy, the frequency width of said Doppler spectrum being a function of the position of the antenna with respect to the axis of the vehicle, means for measuring the frequency width of said Doppler spectrum, said last named means producing a predetermined signal in response to a Doppler spectrum of a certain frequency width and signals other than said predetermined signal in response to Doppler spectra different from said certain frequency width, means responsive to the signals from said measuring means for positioning said antenna during a portion of a scanning pattern at a first position with respect to said vehicle axis so that a Doppler spectrum having said certain frequency width is formed, means for determining said first position and for forming a signal representative thereof, means operative during the portion of the scanning pattern in which the Doppler spectrum of said certain frequency width is formed and responsive to said last named signal for positioning said antenna at said first position at the beginning of said portion of the next scanning pattern and responsive to the other signals from said measuring means for positioning said antenna at a point with respect to the vehicle axis where said measuring means produces said predetermined signal, and means for determining the angle with respect to said vehicle axis at which said spectrum of said certain width and said predetermined signal are produced.

14. In a vehicle which moves with respect to terrain the combination comprising an antenna for transmitting a beam of energy and for receiving the portion of said beam reflected from said terrain, means for scanning said antenna about the axis of said vehicle, means for forming the Doppler spectrum of said received energy, the frequency width of said Doppler spectrum being related to the position of said antenna with respect to said axis, means responsive to the skirts of said Doppler spectrum for causing said antenna to scan equi-angular sectors about the velocity vector of said vehicle projected on said terrain, and means responsive to the frequency width of said Doppler spectrum for determining the angular extremity of the antenna scan on each side of the vehicle axis.

15. In a vehicle which moves with respect to terrain the combination comprising an antenna for transmitting a beam of energy and for receiving the portion of said beam reflected from said terrain, means for scanning said antenna about the axis of said vehicle, means for forming the Doppler spectrum of said received energy, the frequency width of said Doppler spectrum being related to the position of said antenna with respect to said axis, means responsive to the skirts of said Doppler spectrum for causing said antenna to scan equi-angular sectors on each side of the velocity vector of the vehicle projected on the terrain, means for determining the position of said velocity vector thereby determining the drift of said vehicle with respect to its assumed heading over the terrain, means for measuring the frequency width of said Doppler spectrum, said measuring means producing a predetermined signal in response to a Doppler spectrum of a certain frequency width and other signals in response to a spectrum of a different frequency width, means for applying said Doppler spectrum to said measuring means when said equi-angular sectors are being scanned, means responsive to the signals from said measuring means for determining the angular extremity of the antenna scan, the extremity of the angular position of the antenna scan providing information from which to determine the velocity of the vehicle with respect to the terrain.

16. In a vehicle which moves with respect to terrain the combination comprising an antenna for transmitting a beam of energy and for receiving the portion of said beam reflected from said terrain, means for scanning said antenna about the axis of said vehicle, means for forming the Doppler spectrum of said received energy, the frequency width of said Doppler spectrum being related to the position of said antenna with respect to said axis, means responsive to the skirts of said Doppler spectrum for causing said antenna to scan equi-angular sectors on each side of the velocity vector of the vehicle projected on the terrain, means for determining the position of said velocity vector thereby determining the drift of said vehicle with respect to its assumed heading over the terrain, means for measuring the frequency width of said Doppler spectrum, said measuring means producing a predetermined signal in response to a Doppler spectrum of a certain frequency width and other signals in response to a spectrum of a different frequency width, means for applying said Doppler spectrum to said measuring means when said equi-angular sectors are being scanned, means responsive to the signals from said measuring means for positioning said antenna, the extremity of the angular scan being produced when said measuring means produces said predetermined signal, and means for determining the angle of the extremity of the scan to derive therefrom information of the velocity of the vehicle with respect to the terrain.

17. In a vehicle which moves with respect to terrain the combination comprising first means for transmitting a beam of energy and for receiving the portion of said beam of energy reflected from said terrain, means for forming the Doppler spectrum of said received energy, the frequency width of said Doppler spectrum being a function of the position of said first means with respect to the axis of said vehicle, and means for positioning said first means to a position on each side of said axis so that a Doppler spectrum having a certain frequency width is formed when said first means is at said position on each side of said vehicle axis.

18. In a vehicle which moves with respect to terrain the combination comprising first means for transmitting a beam of energy and for receiving the portion of said beam of energy reflected from said terrain, means for forming the Doppler specrum of said received energy, the frequency width of said Doppler spectrum being a function of the position of said first means with respect to the axis of said vehicle, means for positioning said first means to a position on each side of said axis so that a Doppler spectrum having a certain frequency width is formed when said first means is at said position on each side of said vehicle axis, and means for determining the position of said first means on each side of said axis at which said Doppler spectrum of said certain frequency width is produced.

19. In a vehicle which moves with respect to terrain the combination comprising first means for transmitting a beam of energy and for receiving the portion of said beam of energy reflected from said terrain, means for forming the Doppler spectrum of said received energy, the frequency width of said Doppler spectrum being a function of the position of said first means with respect to the axis of said vehicle, means for measuring the frequency width of said Doppler spectrum, said last named means producing a predetermined signal in response to a Doppler spectrum of a certain frequency width and signals other than said predetermined signal in response to Doppler spectra different from said certain frequency width, means responsive to the signals from said measuring means for positioning said first means to a position on each side of said axis such that said predetermined signal is produced.

20. In a vehicle which moves with respect to terrain the combination comprising first means for transmitting a beam of energy and for receiving the portion of said beam of energy reflected from said terrain, means for forming the Doppler spectrum of said received energy, the frequency width of said Doppler spectrum being a function of the position of said first means with respect to the axis of said vehicle, means for measuring the frequency width of said Doppler spectrum, said last named means producing a predetermined signal in response to a Doppler spectrum of a certain frequency width and signals other than said predetermined signal in response to Doppler spectra different from said certain frequency width, means responsive to the signals from said measuring means for positioning said first means to a position on each side of said axis such that said predetermined signal is produced, and means for determining the position of said first means on each side of said axis at which said predetermined signal is produced.

21. In a vehicle which moves with respect to terrain the combination comprising means for transmitting a beam of energy and for receiving the portion of said beam of energy reflected from said terrain, means for forming the Doppler signal spectrum of said received energy, a tracker for measuring the frequency width of said Doppler signal spectrum and for producing a predetermined output signal in response to a signal spectrum of a certain frequency width, said tracker comprising a plurality of filters having different pass band characteristics, means for applying said signal spectrum to the inputs of all said filters, means for detecting the output signal at each of said filters, means for combining said output signals, the pass band characteristics of said filters being selected so that said predetermined output signal is produced at the output of said combining means in response to a signal spectrum of said certain frequency width and other output signals in response to signal spectra having frequency widths different from said certain frequency width.

22. In a vehicle which moves with respect to terrain the combination comprising means for transmitting a beam of energy and for receiving the portion of said beam of energy reflected from said terrain, means for forming the Doppler signal spectrum of said received energy, a tracker for measuring the frequency width of said Doppler signal spectrum and for producing a predetermined output signal in response to a signal spectrum of a certain frequency width, said tracker comprising a low pass filter, a high pass filter and a bandpass filter having a bandpass lying between the cut-off frequencies of said high pass and said low pass filters, means for applying said signal spectrum to the inputs of all three filters, means for summing the outputs of said low pass and said high pass filters, first means for detecting the output of said summing means and forming a first voltage representative thereof, second means for detecting the output of said bandpass filter and forming a second voltage representative thereof, means for taking the difference of said first and second voltages, the output of said difference means being said predetermined signal when said signal spectrum is of said certain width and being a different signal when said signal spectrum is of a width different from said predetermined width.

23. A tracker for producing a predetermined output signal in response to a signal spectrum of a certain frequency width comprising a low pass filter, a high pass filter and a bandpass filter having a bandpass lying between the cut-off frequencies of said high pass and said low pass filters, means for applying said signal spectrum to the inputs of all three filters, means for summing the outputs of said low pass and said high pass filters, first means for detecting the output of said summing means and forming a first voltage representative thereof, second means for detecting the output of said bandpass filter and forming a second voltage representative thereof, means for taking the difference of said first and second voltages, the output of said difference means being said predetermined signals when said signal spectrum is of said certain width and being a different signal when said signal spectrum is of a width different from said predetermined width.

References Cited in the file of this patent

UNITED STATES PATENTS 2,822,536     Sandretto _____ Feb. 4, 1958